United States Patent Office 2,791,347
Patented May 7, 1957

2,791,347

UNDERGROUND RECEPTACLES

Donald Boehm, Milwaukee, Wis.

Application November 1, 1954, Serial No. 466,171

3 Claims. (Cl. 257—121)

My invention relates to receptacles and more particularly to a receptacle or container that is recessed into the ground.

An object of my invention is to provide a recessed receptacle having a cover even with the surface of the ground when the receptacle is in position.

Another object of my invention is to provide perforated portions forming a part of the receptacle, permitting entrance of heat or cold from the soil, so that the interior temperature is governed by the temperature of the soil, not by the outside elements.

Still another object of my invention is to provide a device of the character described which may be inserted in the ground without damage to the perforations.

It is manifest to anyone familiar with the art that when dairy products or the like are delivered to homes, it is imperative that they be placed in an enclosure or container where they are not accessible to contact with animals or the outside elements, and where they are not exposed to extreme cold or heat.

The device specified, illustrated and claimed herein is disposed within the ground and will maintain a cooler temperature in summer and a warmer temperature in winter for the protection of its contents. Inasmuch as the metal cover is the only portion of the container that is exposed, this cover may be insulated on its inner surface for further protection.

Other and further objects of my invention will become more apparent as the description proceeds when taken in conjunction with the drawings, in which.

Figures 1, 2:
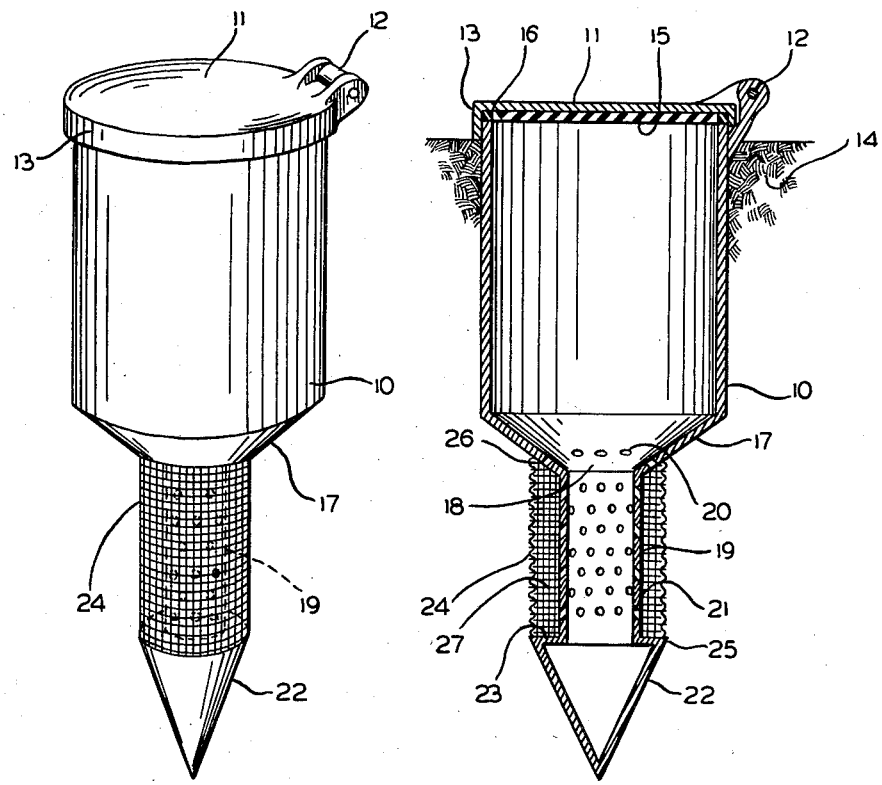
Figure 1 is a perspective outside view of the assembled device.
Figure 2 is a longitudinal vertical cross sectional view of the device showing the assembly of the component parts constituting it.

Similar characters of reference indicate corresponding parts throughout the several views, and referring now to the same, the character 10 shows a cylindrical container which may be constructed of either metal or any other rigid material. This cylindrical body portion 10 is provided with a cover shown at 11 which is hingedly attached to the cylinder 10 at 12 for its manipulation. The cover 11 is provided with a flange 13 which extends around the outer peripheral edge thereof, so as to protect the contents of the container 10 from any rain or moisture, snow or the like, inasmuch as the cover 11 is even with the surface of the ground 14, the entire device being disposed within the ground. The cover 11 may be insulated with a sheet of cork or the like, shown at 15, and has a rubber gasket, shown at 16, extending around the inner peripheral surface of the cover 11 for contact with the upper edge of the cylindrical container 10 to further seal the device when in use. The bottom of the cylinder 10 is tapered at 17 and is open at 18 to give access to a tubular member shown at 19 extending downward from the opening 18 of the tapered portion 17 which is perforated at 20. This tubular member 19 is also provided with perforations 21 through the wall thereof, and these perforations are disposed in a downward angle. The entire tubular member 19 is provided with an enlarged conical shaped bottom portion 22 which is provided with an outwardly extending ledge shown at 23 extending around the entire tubular member 19.

A screen tube of a very fine mesh of screen shown at 24 is attached at its lower end to the edge of the ledge 23 and at its upper end to the surface of the conical portion 17 of the container at 25 and 26, respectively, above the perforations 20. This screen 24, as shown, is of larger diameter than the tubular member 19 to provide a space shown at 27 between the tube 19 and the screen portion 24. Inasmuch as the screen is of a fine mesh, it will act as a guard against vermin or bugs that might possibly emanate from the soil, and which might otherwise find access through the perforations 20 and 21. Yet the heat or coolness of the soil has free communication through the screen and through the perforations 20 and 21 toward the inside of the container 10 for the preservation of the contents thereof.

The enlarged conical bottom portion 22 is of such shape as to aid in inserting the device in the ground, and also provides protective support for the mesh screen 24 surrounding the tubular member 19.

While I have shown a particular arrangement of the component parts constituting my device, many changes in the form and configuration of the various parts may be made without affecting their operativeness, and the spirit of my invention as defined in the appended claims.

I claim:

1. A device of the character described comprising a cylindrical body open at its top and bottom, and tapered at its bottom, said bottom terminating in a vertical tube having a closed lower end, said tube having perforations extending through the walls thereof, a tubular screen member extending vertically around said tube and spaced therefrom, said tubular screen member being attached at its upper end to said tapered bottom and at its lower end to said closed lower end, and a cover hingedly attached to the top of said body for sealing its upper end.

2. A container of the character described comprising in combination a cylindrical body, said body open at its upper end and having a downwardly tapered bottom having a central opening therein, a cover hinged to the upper end of said body, a perforated tubular member attached concentrically to said tapered bottom around the opening therein and extending downward therefrom, said perforated tubular member terminating in an enlarged closed lower end, and a cylindrical screen member surrounding said perforated tubular member and spaced outwardly therefrom, said screen member being attached at its upper end to the conical bottom of said body and at its lower end to said closed lower end at the periphery of the latter.

3. A device of the character described comprising a cylindrical body having solid side walls, said body having an opening at its top and bottom wall with a reduced central opening therein, a perforated tubular vertical member attached to and extending downwardly from the reduced opening of said bottom wall, a conical point attached to the lower end of said tubular member, the upper end of said point being larger in diameter than said tubular member, a tubular screen member surrounding said perforated tubular member and spaced outwardly therefrom, said screen member being attached to the upper periphery of said point and to the bottom of the bottom plate of said body, and an insulated cover detachably engaging the open upper end of said body.

References Cited in the file of this patent

UNITED STATES PATENTS

| 208,619 | Ludlow | Oct. 1, 1878 |
| 238,112 | Halstead | Feb. 22, 1881 |
| 2,364,144 | Hunsaker | Dec. 5, 1944 |